United States Patent [19]

Astbury et al.

[11] 4,186,243

[45] Jan. 29, 1980

[54] IMAGE PRODUCING SYSTEM

[75] Inventors: James H. Astbury; Barrie Broadbent, both of Stockport, England

[73] Assignee: CIBA-GEIGY Corporation, Ardsley, N.Y.

[21] Appl. No.: 767,853

[22] Filed: Feb. 11, 1977

[30] Foreign Application Priority Data

Feb. 25, 1976 [GB] United Kingdom ............... 7374/76

[51] Int. Cl.$^2$ ............................................. B41M 5/12
[52] U.S. Cl. .................................. 428/537; 282/27.5; 427/150; 428/364; 428/488; 428/914
[58] Field of Search ................. 427/150, 151, 153; 428/411, 537, 913, 914, 307, 364, 488; 282/27.5; 106/21

[56] References Cited

U.S. PATENT DOCUMENTS

| 3,769,045 | 10/1973 | Maierson et al. | 106/19 |
| 3,823,022 | 7/1974 | Thomas | 117/1.7 |
| 3,900,215 | 8/1975 | Kato et al. | 282/27.5 |
| 3,955,025 | 5/1976 | Matsukawa et al. | 428/212 |
| 3,979,550 | 9/1976 | Panken | 428/488 |
| 3,983,292 | 9/1976 | Saito et al. | 428/306 |
| 4,021,059 | 5/1977 | Skelly et al. | 282/27.5 |
| 4,023,830 | 5/1977 | Skelly et al. | 282/27.5 |

*Primary Examiner*—George F. Lesmes
*Assistant Examiner*—Bruce H. Hess
*Attorney, Agent, or Firm*—Prabodh I. Almaula

[57] ABSTRACT

An image producing system is provided, wherein an activator composition e.g. made up as a crayon or pencil, when contacted with paper substrate containing an azo color former yields an image by color change.

13 Claims, No Drawings

IMAGE PRODUCING SYSTEM

The present invention relates to an image forming system using colour formers.

In German Offenlegungsschrift 2 517 936 there is described a composition for incorporating into the mass of paper, or for completely or partially coating paper, which comprises a dispersion of a colour former in a mixture of water and a water-miscible organic solvent for the colour former. Said specification also describes an image producing system which comprises a paper substrate impregnated or coated with a dispersion as described above, and a carrier material impregnated with a solution of an organic acid in a weakly volatile high boiling solvent.

An image forming system is also known which comprises forming an image on a copy sheet with a leuco dye intermediate or a Lewis acid and then marking the image with a solid marking composition comprising a wax and a Lewis acid of leuco dye intermediate respectively to produce a colour.

It is an object of the present invention to provide a solid colour former activating composition which selectively activates certain azo colour formers and which produces colours quicker than known solid activating compositions.

It is another object of the present invention to provide an image producing system which is stable over long periods of time.

Accordingly the present invention provides an image producing system which comprises a paper substrate impregnated or coated with a composition comprising an azo colour former and an activator which is a composition comprising a clay capable of activating said colour former, a solid organic carrier for the clay and an organic solvent having low volatility, the colour former having the general formula I

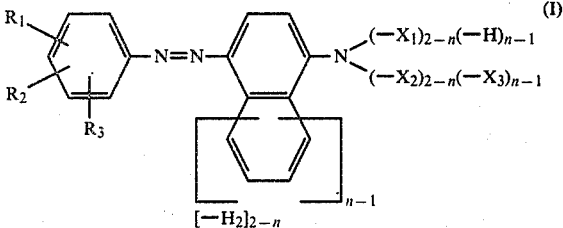

in which $R_1$, $R_2$ and $R_3$ each represents hydrogen, halogen, alkyl, alkoxy, aryloxy, alkoxycarbonyl, dialkylaminocarbonyl, acylamino, acyl(alkyl)amino,

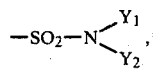

in which $Y_1$ and $Y_2$ each represents alkyl or aryl, or in which $Y_1$ and $Y_2$ together represent an alkylene group; $X_1$ is hydrogen or an alkyl group, $X_2$ is an alkyl, cyanoalkyl or arylmethylene group or $X_1$ and $X_2$ together represent an alkylene group, $X_3$ is an alkyl or aryl group and n is 1 or 2, preferably 1.

The invention also provides a colour former activating composition comprising a clay capable of activating said azo colour former, a solid organic carrier for the clay and an organic solvent having low volatility.

Suitable organic carriers include paraffin wax or a long chain fatty acid with e.g. 12 to 22 carbon atoms, such as stearic acid or palmitic acid. Preferably a paraffin wax which is solid at temperatures below 50° C. is used. The resulting solid composition may then be made up as a crayon or pencil.

The clay is one which activates the azo colour former defined above. Suitable clays include Silton, Attapulgite, bentonite, silica and montmorillonite. Preferably an acidic clay is used, most preferably Silton clay.

The colour former activating composition may contain from 40-85% by weight of the solid carrier, preferably from 40-60% by weight.

The colour former activating composition also contains a solvent having low volatility, which is also preferably odourless, colourless, and non-toxic. The solvent may be any organic oily liquid which is capable of acting as a transport medium to facilitate contact between the clay and the colour former, and thus increase the speed of reaction. The solvent preferably has a boiling point of at least 150° C., preferably at least 300° C. Suitable solvents include, for example, partially hydrogenated terphenyl, liquid paraffin, mineral oil, tricresyl phosphate, carboxylic acid esters such as di-n-butyl phthalate, dioctyl phthalate and dioctyl sebacate, trichlorobenzene, glycerol, nitrobenzene, trichloroethyl phosphate, water-insoluble hydrocarbon oils, alkyl phthaloyl butyl glycollates, such as propyl, pentyl-, hexyl-, butyl-phthaloyl butyl glycollate, diethylene glycol, triethylene glycol or polyethylene glycols having a molecular weight of from 200 to 600, e.g. 400, alkyl naphthalenes, or mixtures of such solvents. The amount of solvent should be not greater than 25% by weight, preferably from 10 to 20% by weight.

The speed of reaction may also be increased by incorporating into the activator composition a salt of a transition metal, such as salts of zinc, iron, cobalt, nickel, vanadium and manganese. Preferably the salt is zinc chloride. The amount of metal salt may be up to the amount of clay, but is preferably in amounts of up to 5% by weight of the total composition.

The activating composition can be made by heating the solid carrier until molten, and then the other ingredients are added and the mixture stirred to produce an intimate blend. The blend is then cooled and shaped.

The colour former composition for treating the paper may be a dispersion of the azo colour former in a mixture of water and a water-miscible organic solvent for the colour former.

The water-miscible organic solvent for the colour former should be one which will dissolve the selected colour former and be miscible with water. Suitable solvents include ketones, e.g. acetone; alkoxyethanols, e.g. methoxy ethanol and ethoxyethanol; dimethyl formamide and dimethyl sulphoxide. However, it is preferably non-flammable or has a relatively high flash point and preferably non-toxic. It is also preferred to use a fairly low boiling solvent, for example one having a boiling point below 150° C.

The amount of colour former in the dispersion varies according to the particular colour former used and on the desired effect, i.e. whether a dark colour is required or not. In general, the amount used may be from 0.01% to 2%, preferably 0.01% to 1% and more preferably 0.1% to 0.5% by weight, e.g. 0.2%.

In addition, the composition may also contain an organic solvent of low volatility such as those described above for use in the activator composition. The presence of such a solvent in the paper increases the reaction speed of the colour former with the clay even further. The solvent used is preferably the same as that which is present in the activator composition. The amount of solvent used may be up to 2.0%, preferably up to 0.5% by weight, based on weight of paper.

The paper can be coated by any suitable means, such as a size press, roller coating, air-knife coating, blade coating, brush coating or printing.

When the dispersion is used for treating paper pulp in a beater it is advantageous to add the solution of colour former in organic solvent directly into the beater which already contains a considerable amount of water thereby forming the dispersion in situ.

The paper used must be either neutral or alkaline sized to prevent the colour former from reacting prematurely with the paper. The pH of the paper used should be not below 6.5 and this can be achieved, for example, by sizing with aluminium sulphate, rosin size and sodium aluminate to produce a neutral size, or with a ketene dimer to produce an alkaline sized paper.

In some cases it is found that the dispersion is not sufficiently stable to carry out, for example, a long run by a coating technique as previously described. In these cases it is advantageous to add a polymer latex to the dispersion, acrylic latices being particularly suitable. This may be added in amounts of from 0.1 to 5%, preferably from 0.5 to 2%. In addition, the dispersion may also contain a starch in a concentration of from 1 to 10%, preferably about 5%.

The paper may also be printed using an ink composition which as described and claimed in German Offenlegungsschrift 2 517 992 comprises a neutral or substantially neutral ink vehicle, and an azo colour former as described above.

Suitable ink vehicles are those which have a pH of about 7. If the pH is not exactly 7 it is preferably slightly above rather than below 7. Examples of such vehicle are nitrocellulose, zinc resinate, vinyl, acrylic polyamide and alkyd resins, ethyl cellulose, stand oils and resin modified stand oils. The ink may contain other conventional ingredients such as an alcohol, e.g. ethanol, propanol or methylated spirits, in amounts up to the amount of ink vehicle, preferably up to about 80% by weight of the ink vehicle, when a liquid ink is required, e.g. a gravure or flexographic ink.

The amount of colour former in the ink may be from 0.01% to 2%, preferably 0.01% to 1% and more preferably 0.1% to 0.5% by weight, e.g. 0.2%.

The ink may also contain an organic solvent of low volatility as described above, particularly when nitrocellulose is used in the vehicle, in order to ensure that the clay has ready access to the colour former in the ink after storage, i.e. the ink vehicle is prevented from becoming too impervious during storage. The amounts of solvent may be from 5-15% by weight, based on the vehicle, preferably about 10% by weight.

The ink may also contain a non-volatile liquid organic base. The amount of organic base in the ink may vary over a wide range, but should be sufficient to ensure that no reaction occurs between the colour former and the substrate on which the ink is printed. The amount may be up to 40% by weight, although amounts of up to 10% are sufficient on most substrates. The amount used is preferably from 0.2% to 6%, more preferably 0.2% to 2%. The liquid organic base may be an amine or an alkanolamine with preferably 2 to 6 carbon atoms such as triethanolamine or diethanolamine.

As an additional feature, the dispersion or ink may also contain a dyestuff or pigment. This enables different colours to be produced when the treated paper is contacted with a colour former activating substance.

When a dispersion is used to impregnate the paper in a beater, the dyestuff used may be a water soluble substantive dyestuff or a dispersion of a water insoluble dye or pigment. When the dispersion is used to coat paper by one of the techniques described, the dyestuff may be any water-soluble dye or a dispersion of a water insoluble dye or pigment. The dyestuff may be of any desired colour, providing, of course, that it does not mask the colour produced when the colour former is activated.

Various pigments may be used and include organic pigments such as azo, azomethine, phthalocyanines, polycyclic pigments such as quinacridones, dioxazines, vat dyestuffs, anthraquinones and isoindolinones and salts of basic pigments precipitated with the heteropoly acids of phosphorus, tungsten and molybdenum. Inorganic pigments may also be used, such as titanium dioxide and red and yellow iron oxides.

Various colour changes are possible by using different dyes and colour formers. Some of the numerous possible colour changes are as follows:

Yellow→Blue

This can be achieved by the use of a yellow colour former, which changes colour to blue when activated, either alone or with a yellow dyestuff.

Yellow→Red

As for yellow→blue, except that colour formers which turn red when activated are used.

Red→Blue

Red dye plus a yellow colour former which turn blue when activated.

Green→Blue

Green dye plus a yellow colour former which turn blue when activated.

Green→Red

Green dye plus a yellow colour former which turn red when activated or a blue dye plus a yellow colour former which turns red when activated.

Yellow→Green

Yellow dye plus a yellow colour former which turns green when activated.

Colour→Black

Dye plus a mixture of colour formers which when activated produce colours which, with the dye form black.

It should be noted that where a dyestuff is present, the final colour is an additive effect of the dyestuff colour and the colour produced by the activated colour former.

Other multicolour effects are possible if, for instance, paper impregnated with one colour former is printed with an ink containing colour former which changes to a different colour than the first.

The azo colour formers are preferably those of the general formula II:

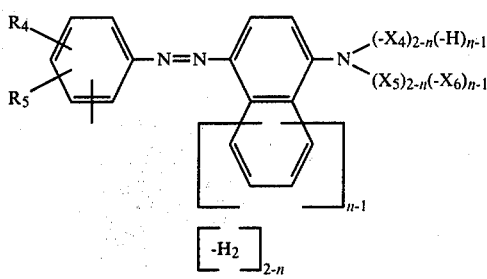

(II)

in which $R_4$, $R_5$ and $R_6$ each represent lower alkyl, lower alkoxy, halogenphenoxy, phenoxy, lower alkoxycarbonyl, lower dialkylaminocarbonyl, acetylamino, halogen, acetyl (lower alky)amino,

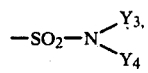

in which $Y_3$ and $Y_4$ each represents lower alkyl or phenyl, or in which $Y_3$ and $Y_4$ together represent an alkylene group with 4 or 5 carbon atoms and, at most two of the radicals $R_4$, $R_5$ and $R_6$ being hydrogen, $X_4$ is hydrogen or lower alkyl, $X_5$ is lower alkyl, lower cyanoalkyl or benzyl, or $X_4$ and $X_5$ together represent an alkylene group with 4 or 5 carbon atoms, $X_6$ is lower alkyl or phenyl and n is 1 or 2.

Of special interest are azo compounds of the formula III:

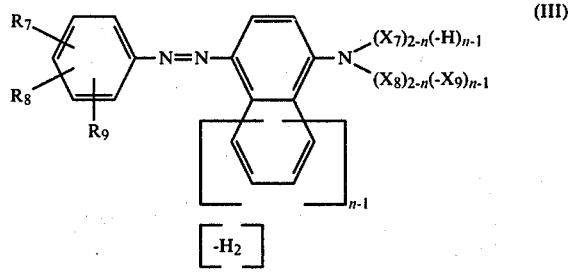

(III)

in which $R_7$, $R_8$ and $R_9$ each represents methyl, methoxy, phenoxy, dichlorophenoxy, methoxycarbonyl, dimethylaminocarbonyl, acetylamino, chlorine, acetyl(methyl)amino,

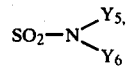

in which $Y_5$ and $Y_6$ each represent methyl, ethyl or phenyl or in which $Y_5$ and $Y_6$ together represent a pentylene group, at most two of the radicals, $R_7$, $R_8$ and $R_9$ being hydrogen, $X_7$ is methyl or ethyl, $X_8$ is methyl, 2-cyanoethyl or benzyl, $X_9$ is methyl or ethyl and n is 1 or 2.

Advantageous results are obtained with colour formers of the formula IV:

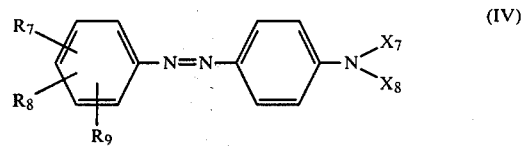

(IV)

in which $R_7$, $R_8$, $R_9$, $X_7$ and $X_8$ have the meanings given above, and very suitable are colour formers of the formula V:

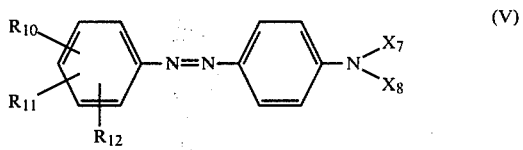

(V)

in which $R_{10}$, $R_{11}$ and $R_{12}$ each represents methoxy, methoxycarbonyl chlorine, diethylaminosulfonyl or acetylamino, at most two of the radicals $R_{10}$, $R_{11}$ and $R_{12}$ being hydrogen and $X_7$ and $X_8$ have the meanings given above.

The terms lower alkyl or lower alkoxy in the definitions of radicals of the colour formers means radicals with 1 to 5, especially 1 to 3 carbon atoms, such as methyl, ethyl, propyl, benzyl or amyl.

When one or more of the R-radicals contain acyl groups, the acyl radical may be derived, for example, from an aliphatic monocarboxylic acid having 1 to 4 carbon atoms such as acetic acid.

When one or more of the R-radicals is halogen it is, e.g. iodine, bromine, but preferably chlorine.

When $Y_1$ and $Y_2$ or $Y_3$ and $Y_4$ together represent an alkylene group they form together with the nitrogen atom a heterocyclic ring such as piperidine or pyrrolidine.

Aryl radicals in any of the definitions of the colour formers especially mean naphthalene, diphenyl and preferably benzene radicals.

These colour formers may be prepared by conventional methods known in the art, e.g. by diazotizing a substituted aniline and coupling it onto a N-substituted aniline.

Specific Examples of compounds of general formula I which may be used in the present invention are given in Table I, in which n in formula I is 1 and in Table II in which n in formula I is 2.

TABLE I

| No. | Substituents in formula I | | | | | Absorption maximum λ max. in nm | | Colour of* protonated dye |
| | $R_1$ | $R_2$ | $R_3$ | $X_1$ | $X_2$ | free base | protonated | |
| --- | --- | --- | --- | --- | --- | --- | --- | --- |
| 1 | —H | —H | 4-CH$_3$CONH | —CH$_3$ | —CH$_3$ | 411 | 550 | violet |
| 2 | 2-CH$_3$ | —H | —H | —CH$_3$ | —CH$_3$ | 401 | 506 | orange |
| 3 | —H | 3-CH$_3$ | —H | —CH$_3$ | —CH$_3$ | 406 | 520 | red |
| 4 | —H | —H | 4-CH$_3$ | —CH$_3$ | —CH$_3$ | 404 | 528/542 | red |
| 5 | 2-OCH$_3$ | —H | —H | —CH$_3$ | —CH$_3$ | 413 | 540 | violet |
| 6 | —H | —H | 4-OCH$_3$ | —CH$_3$ | —CH$_3$ | 404 | 556 | violet |
| 7 | 2-OCH$_3$ | —H | 4-OCH$_3$ | —CH$_3$ | —CH$_3$ | 412 | 578 | blue-grey |

TABLE I-continued

| No. | R₁ | R₂ | R₃ | X₁ | X₂ | Absorption maximum λ max. in nm free base | protonated | Colour of* protonated dye |
|---|---|---|---|---|---|---|---|---|
| 8 | 2-OCH₃ | —H | 5-OCH₃ | —CH₃ | —CH₃ | 425 | 560 | grey |
| 9 | —H | 3-Cl | —H | —CH₃ | —CH₃ | 416 | 510 | orange |
| 10 | —H | —H | 4-Cl | —CH₃ | —CH₃ | 415 | 519 | orange |
| 11 | —H | 3-Cl | 4-CH₃ | —CH₃ | —CH₃ | 413 | 510 | orange |
| 12 | 2-CH₃ | —H | 4-Cl | —CH₃ | —CH₃ | 414 | 506 | orange |
| 13 | 2-CH₃ | —H | 5-Cl | —CH₃ | —CH₃ | 418 | 506 | orange |
| 14 | 2-OCH₃ | 4-OCH₃ | 5-Cl | —CH₃ | —CH₃ | 420 | 574 | green-grey |
| 15 | 2-OC₆H₅ | —H | 5-Cl | —CH₃ | —CH₃ | 430 | 518 | orange |
| 16 | 2-OC(=O)-C₆H₃(Cl)(Cl) | —H | —H | —CH₃ | —CH₃ | 418 | 518 | orange |
| 17 | 2-COOCH₃ | —H | —H | —CH₃ | —CH₃ | 417 | 518 | cerise red |
| 18 | —H | 3-SO₂—N(piperidyl) | 4-CH₃ | —CH₃ | —CH₃ | 420 | 514 | orange |
| 19 | —H | 3-SO₂—N(CH₃)(C₆H₅) | 4-CH₃ | —CH₃ | —CH₃ | 419 | 517/535 | orange |
| 20 | —H | 3-CH₃ | 4-OCH₃ | —CH₃ | —CH₃ | 408 | 542 | brown |
| 21 | —H | —H | 4-N(CH₃)(COCH₃) | —CH₃ | —CH₃ | 418 | 520 | orange |
| 22 | —H | —H | 4-CO—N(CH₃)(CH₃) | —CH₃ | —CH₃ | 421 | 516 | orange |
| 23 | —H | —H | 4-N(H)(COCH₃) | —CH₃ | —CH₂CH₂CN | 405 | 556 | violet |
| 24 | —H | 3-CH₃ | —H | —CH₃ | —CH₂CH₂CN | 356 | 522/538 | red |
| 25 | —H | —H | 4-CH₃ | —CH₃ | —CH₂CH₂CN | 396 | 534 | brown |
| 26 | 2-OCH₃ | —H | —H | —CH₃ | —CH₂CH₂CN | 400 | 542 | brown |
| 27 | 2-OCH₃ | —H | 5-OCH₃ | —CH₃ | —CH₂CH₂CN | 416 | 566 | grey |
| 28 | —H | 3-Cl | —H | —CH₃ | —CH₂CH₂CN | 406 | 513/534 | orange |
| 29 | —H | —H | 4-Cl | —CH₃ | —CH₂CH₂CN | 404 | 523/541 | orange |
| 30 | —H | 3-Cl | 4-CH₃ | —CH₃ | —CH₂CH₂CN | 404 | 523/540 | orange |
| 31 | —H | 3-CH₃ | —H | —C₂H₅ | —CH₂—C₆H₅ | 400 | 524/543 | brown-orange |
| 32 | 2-COOCH₃ | —H | —H | —C₂H₅ | —CH₂—C₆H₅ | 418 | 527/542 | red |
| 33 | 2-CH₃ | 3-Cl | —H | —CH₃ | —CH₃ | 413 | 500 | orange |
| 34 | 2-O—C₆H₅ | —H | 5-t-C₅H₁₁ | —CH₃ | —CH₃ | 416 | 526 | orange |
| 35 | —H | —H | 4-OCH₃ | —CH₃ | —CH₂CH₂CN | 398 | 555 | brown |

*Colour here refers to protonation in a solution of 95% acetic acid.

Table II

| No. | R₁ | R₂ | R₃ | X₃ | Absorption maximum λ max. in nm free base | protonated | Colour of protonated dye |
|---|---|---|---|---|---|---|---|
| 101 | —H | 3-SO₂—N(piperidyl) | 4-CH₃ | —C₂H₅ | | | violet |
| 102 | —H | 3-SO₂—N(CH₃)(CH₃) | 4-CH₃ | —C₂H₅ | | | violet |
| 103 | 2-CH₃ | —H | 4-Cl | —C₂H₅ | 466 | 540 | violet |

The invention will be illustrated by the following Examples, in which parts and percentages are by weight.

EXAMPLE 1

A crayon was produced by melting 40% of paraffin wax and adding thereto 40% of Silton Clay and 20% of dioctyl sebacate. The mixture was thoroughly stirred until an intimate blend was formed, and was then cooled and shaped into a crayon.

EXAMPLE 2

A crayon was produced by melting 25% wax and 24% stearic acid and adding thereto 34% Silton Clay, 10% triphenyl phosphate and 7% dioctyl sebacate. The mixture was thoroughly stirred until an intimate blend was formed, and was then cooled and shaped into a crayon.

EXAMPLE 3

A crayon was produced by melting 70 parts of paraffin wax and adding thereto 16 parts Silton Clay, 3 parts zinc chloride, and 11 parts di-octyl sebacate. The mixture was thoroughly stirred until an intimate blend was formed, and was then cooled and shaped into a crayon.

EXAMPLE 4

Example 3 was repeated, except that the 11 parts of di-octyl sebacate was replaced by 11 parts mineral oil.

EXAMPLE 5

Example 3 was repeated, except that 11 parts of di-octyl sebacate was replaced by 11 parts of a hydrogenated terphenyl.

EXAMPLE 6

0.1 Parts of colour former No. 32 in Table I having the formula:

(32)

[structure: phenyl-N=N-phenyl-N(C$_2$H$_5$)(CH$_2$C$_6$H$_5$) with COOCH$_3$ substituent]

was dissolved in 5 parts of 2-ethoxy ethanol. This solution was then poured into 50 parts of water with agitation to produce dispersion.

This dispersion was added to a beater containing 50 parts of paper pulp dispersed in 2,500 parts of water. 1 part of ketene dimer was then added as sizing agent, and a sheet of paper was then formed in the usual way.

When the yellow paper was marked with the crayons from Examples 1–5, the yellow changed colour to red where the crayon had contacted the paper.

EXAMPLE 7

Example 6 was repeated, except that the colour former solution was added directly to the paper pulp dispersion. Similar results were obtained.

EXAMPLE 8

Example 6 was repeated, except that the colour former was one of the formula:

[structure: CH$_3$O-phenyl-N=N-phenyl-N(CH$_3$)$_2$ with OCH$_3$ substituent]

The colour change was from yellow to blue.

EXAMPLE 9

Example 7 was repeated, except that the colour former of Example 8 was used. Similar results were obtained in Example 8.

EXAMPLE 10

A surface coating was formulated from the colour former of the formula given in Example 6, dioctyl sebacate, methylated spirits and a nitrocellulose solution. This was printed on to a sheet of paper. When marked with the crayons from Examples 1–5 the yellow printing changed colour to red.

EXAMPLE 11

Example 10 was repeated using the colour former of the formula:

[structure: dimethoxy, chloro-substituted phenyl-N=N-phenyl-N(CH$_3$)$_2$]

The colour change with the crayons was from yellow to blue.

Equally good results may be achieved when the specific colour formers mentioned in the Examples above are replaced by any one of the other colour formers of Tables I and II, the resulting colour being that given in the Tables.

What is claimed is:

1. An image producing system, which comprises (a) a paper substrate impregnated or coated with a composition comprising an azo color former and (b) a solid activator composition in the form of a crayon or a pencil, said activator composition comprising a clay capable of activating said color former, a solid organic carrier for the clay and an organic oily liquid solvent having low volatility, the color former having the general formula I (I)

[structure of formula I with R$_1$, R$_2$, R$_3$ substituents, N=N linkage, and $(-X_1)_{2-n}(-H)_{n-1}$, $(-X_2)_{2-n}(-X_3)_{n-1}$, $[-H_2]_{2-n}$ groups]

in which R$_1$, R$_2$ and R$_3$ each represents hydrogen, halogen, alkyl, alkoxy, aryloxy, alkoxycarbonyl, dialkylaminocarbonyl, acylamino, acyl(alkyl)amino, $$-SO_2-N\genfrac{}{}{0pt}{}{Y_1}{Y_2},$$

in which Y$_1$ and Y$_2$ each represents alkyl or aryl, or in which Y$_1$ and Y$_2$ together represent an alkylene group; X$_1$ is hydrogen or an alkyl group, X$_2$ is an alkyl, cyanoalkyl or arylmethylene group or X$_1$ and X$_2$ together represent an alkylene group, $X_3$ is an alkyl or aryl group and n is 1 or 2.

2. A system as claimed in claim 1, in which the clay is Silton, attapulgite, bentonite, silica or montmorillonite.

3. A system as claimed in claim 1, in which the organic solvent is partially hydrogenated terphenyl, liquid paraffin, mineral oil, tricresyl phosphate, a carboxylic acid ester, trichlorobenzene, glycerol nitrobenzene trichloroethyl phosphate, a water-insoluble hydrocarbon oil, an alkyl phthaloyl butyl glycollate, diethylene glycol, triethylene glycol, a polyethylene glycol having a molecular weight of from 200 to 600, an alkyl naphthalene, or mixtures thereof.

4. A system as claimed in claim 1, in which the activator also contains a salt of a transition metal.

5. A system as claimed in claim 1, in which the color former composition for treating the paper is a dispersion of the azo color former in a mixture of water and a water-miscible organic solvent for the color former.

6. A system as claimed in claim 5 in which the dispersion also contains a polymer latex.

7. A system as claimed in claim 1, in which the color former composition is an ink which comprises a neutral or substantially neutral ink vehicle and the azo color former.

8. A system as claimed in claim 7, in which the ink also contains a non-volatile liquid organic base.

9. A system as claimed in claim 1, in which the color former composition also contains a dyestuff or a pigment.

10. A system as claimed in claim 1, in which the azo color former is one having the general formula II

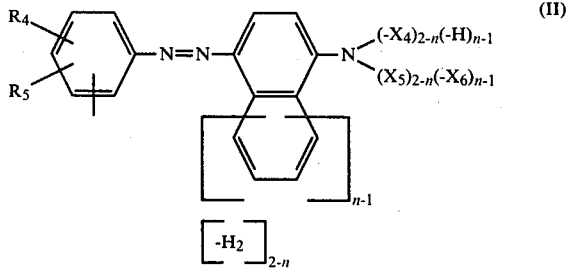

(II)

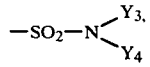

in which $R_4$, $R_5$ and $R_6$ each represent lower alkyl, lower alkoxy, halogenphenoxy, phenoxy, lower alkoxycarbonyl, lower dialkylaminocarbonyl, acetylamino, halogen, acetyl (lower alky)amino, $$-SO_2-N\begin{matrix}Y_3,\\Y_4\end{matrix}$$

in which $Y_3$ and $Y_4$ each represents lower alkyl or phenyl, or in which $Y_3$ and $Y_4$ together represent an alkylene group with 4 or 5 carbon atoms and, at most two of the radicals $R_4$, $R_5$ and $R_6$ being hydrogen, $X_4$ is hydrogen or lower alkyl, $X_5$ is lower alkyl, lower cyanoalkyl or benzyl, or $X_4$ and $X_5$ together represent an alkylene group with 4 or 5 carbon atoms, $X_6$ is lower alkyl or phenyl and n is 1 or 2.

11. A system as claimed in claim 10, in which the azo color former is one having the general formula III

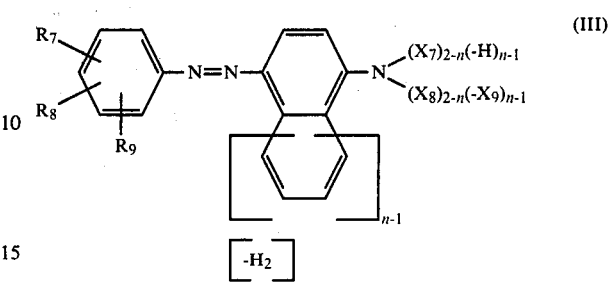

(III)

in which $R_7$, $R_8$ and $R_9$ each represents methyl, methoxy, phenoxy, dichlorophenoxy, methoxycarbonyl, dimethylaminocarbonyl, acetylamino, chlorine, acetyl(methyl)amino, $$SO_2-N\begin{matrix}Y_5,\\Y_6\end{matrix}$$

in which $Y_5$ and $Y_6$ each represent methyl, ethyl or phenyl or in which $Y_5$ and $Y_6$ together represent a pentylene group, at most two of the radicals, $R_7$, $R_8$ and $R_9$ being hydrogen, $X_7$ is methyl or ethyl, $X_8$ is methyl, 2-cyanoethyl or benzyl, $X_9$ is methyl or ethyl and n is 1 or 2.

12. A system as claimed in claim 11, in which the color former is one having the general formula IV

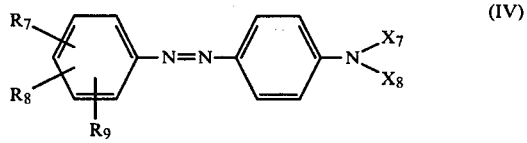

(IV)

in which $R_7$, $R_8$, $R_9$, $X_7$ and $X_8$ have the meanings given in claim 11.

13. A system as claimed in claim 11, in which the color former is one having the general formula V

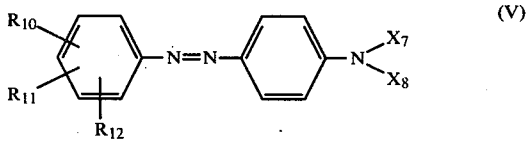

(V)

in which $R_{10}$, $R_{11}$ and $R_{12}$ each represents methoxy, methoxycarbonyl chlorine, diethylaminosulfonyl or acetylamino, at most two of the radicals $R_{10}$, $R_{11}$ and $R_{12}$ being hydrogen and $X_7$ and $X_8$ have the meanings given in claim 11.

* * * * *